United States Patent [19]

Umeno

[11] 4,281,446
[45] Aug. 4, 1981

[54] WAY OF JOINING A HARD AND A SOFT SHEET

[75] Inventor: Yoshihumi Umeno, Yokosuka, Japan

[73] Assignee: Nissan Motor Company, Limited, Japan

[21] Appl. No.: 67,168

[22] Filed: Aug. 16, 1979

[30] Foreign Application Priority Data

Aug. 23, 1978 [JP] Japan .................................. 53-103198

[51] Int. Cl.³ .............................................. B23P 11/00
[52] U.S. Cl. .................................... 29/432.1; 29/512;
    29/513; 29/522 R; 29/526 R; 113/116 FF;
    403/283
[58] Field of Search ...................... 29/432, 513, 432.1,
    29/526 R, 432.2, 512, 509, 522 R; 403/283;
    113/116 FF

[56] References Cited

U.S. PATENT DOCUMENTS

| | | | |
|---|---|---|---|
| 1,831,556 | 11/1931 | Figge | 29/432 |
| 2,515,105 | 7/1950 | Weisberg | 29/432 X |
| 3,197,729 | 7/1965 | Sarazen | 29/432 UX |
| 3,283,061 | 11/1966 | Balling | 403/283 X |
| 3,364,560 | 1/1968 | Roy | 29/432 |

*Primary Examiner*—Charlie T. Moon
*Attorney, Agent, or Firm*—Lane, Aitken, Ziems, Kice & Kananen

[57] ABSTRACT

A method and structure for joining a harder to a softer sheet are disclosed. Sharp projections are formed surrounding a hole on the harder sheet, and these projections are penetrated through the softer sheet and then bent back and around so as to engage with the softer sheet. In a preferred embodiment, the projections are formed by boring a conical hole in the harder sheet, cutting radial slots which lead outwards from the hole, and bending the periphery of the hole perpendicular to the sheet. The acute angle formed by the conical surface of the hole and one face of the sheet ensures that the projections are sharp.

7 Claims, 10 Drawing Figures

WAY OF JOINING A HARD AND A SOFT SHEET

BACKGROUND OF THE INVENTION

The present invention relates to a structure and a method for joining together members, and more particularly relates to a structure and a method for joining together a hard plate and a soft plate.

In various structures, a hard plate such as a steel plate and a soft plate such as a synthetic resin plate, a cardboard plate, or a wooden plate, are superimposed and joined together in various ways.

For example, a conventionally made door structure of an automobile is shown in FIG. 1. A door outer panel 1 and a door inner panel 2 are joined together at their upper and lower edges. A portion 2a of the inner panel is displaced towards the inner part of the door. A cardboard member 3 is provided on the outside of the portion 2a. The upper part of the cardboard member 3 is supported on a trim supporting panel 2'. The surface of the cardboard member 3 is covered by a pad 20 and a cover 25, which together constitute a door trim. The steel plate 2' and the cardboard member 3 may be joined together by various connecting structures, such as, for example, a rivet, shown in section in FIG. 2, or a metallic clip 6, shown in section in FIG. 3.

Such structures require joint members such as rivets or clips, and further holes must be provided in at least the steel plate 2' for passing the clips or the rivets. Therefore such a joining structure or method is expensive and involves several production steps.

SUMMARY OF THE INVENTION

Accordingly, it is an object of the present invention to provide a joining structure for a hard plate to a soft plate, in which no special separate joining member is required, and no passing holes need to be drilled in the harder plate.

It is also an object of the present invention to provide a method for joining plates which is simple and quick, and in which no special separate joining member needs to be formed.

According to the present invention, these and other objects are accomplished by a structure for joining a harder plate to a softer plate, comprising a plurality of portions of the harder plate surrounding a hole therein which project from the plane of the harder plate through the softer plate and whose projecting ends, which are sharp, are bent around and engaged with the surface of the softer plate; and by a method of joining together a harder plate and a softer plate, comprising the steps, in order, of: (a) forming a plurality of portions of the harder plate surrounding a hole therein and projecting from the plane thereof, which have sharp ends; (b) penetrating these portions through the softer plate; and (c) bending the sharp ends around so that they engage with the softer plate.

According to particular features of the present invention, the bending over of these sharp ends may be outwards, away from one another; and the projecting portions may be formed from the material of the harder plate which was in the hole, by forming a bore through the harder plate, and bending at least parts of the material surrounding the bore out of the plane of the harder sheet. According to a further particular feature of the present invention, the bore may be formed as a conical bore, and thus the part which was the periphery of the narrowest part of the bore, after the bending of the material surrounding the bore out of the plane of the harder sheet, constitutes the said sharp ends of the projecting portions. According to yet another particular feature of the present invention, after the bore is formed, and before the material surrounding it is bent out of the plane of the harder sheet, generally radial cuts may be formed in the material surrounding the said bore, so as to make the bending process easier. If such cuts are not formed, then it is expected that the material surrounding the bore will split in a generally radial direction as it is bent, but it is preferred that the cuts should be made.

BRIEF DESCRIPTION OF THE DRAWINGS

The present invention will become more fully understood from the following description of a preferred embodiment thereof, and from the appended drawings. It should be clearly understood, however, that the drawings and the description of the embodiment are given for the purposes of illustration and explanation only, and are not to be taken as limiting the scope of the present invention in any way.

In the drawings.

DESCRIPTION OF THE PREFERRED EMBODIMENT

Figure 1:
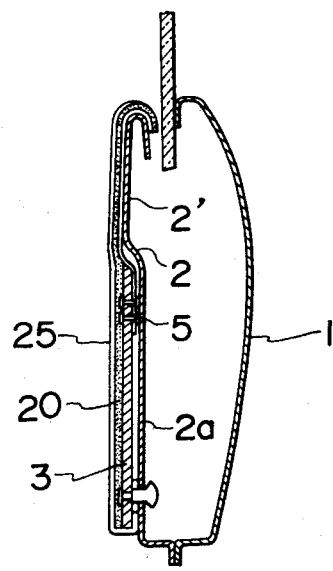
FIG. 1 is a vertical section of a conventionally made car door, illustrating a prior art joining structure.
Figure 2:
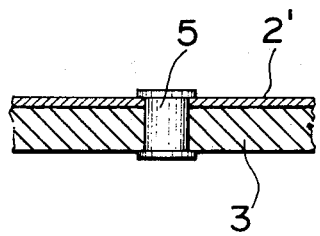
FIGS. 2 and 3 are enlarged sectional views of prior art joining structures.
Figure 3:
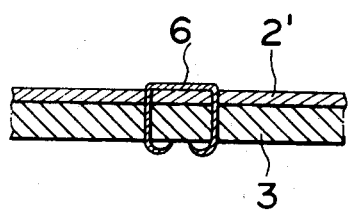
Figure 4:
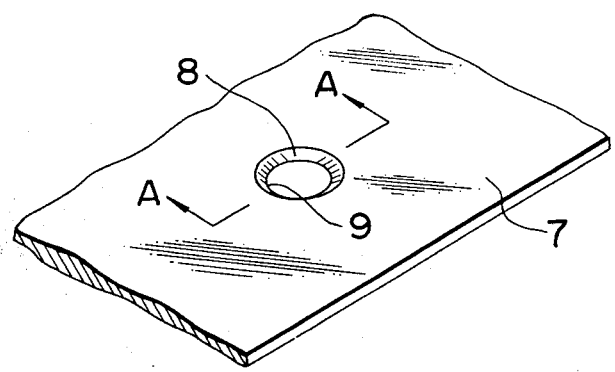
FIG. 4 is a perspective view of a steel plate, which is to be joined to a softer plate according to the present invention, and on which the first step of the process of the present invention has been performed, by drilling a conical hole in it.
Figure 5:
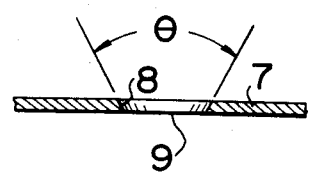
FIG. 5 is a sectional view of the plate of FIG. 4, along the line A—A.

Referring to FIGS. 4 through 10, 7 designates a steel plate which is to be attached to a softer plate 13. A bore 9 is formed on the plate 7, and this bore 9 is conical or chamfered, so that the smaller end of the bore presents a sharp edge. The cone is of an angle theta ($\theta$), as shown in FIG. 5.

Figure 6:
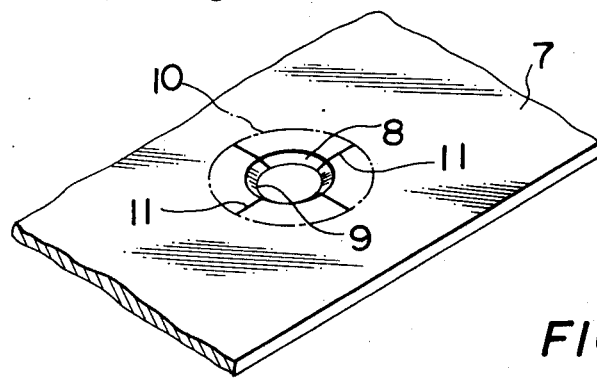
FIG. 6 is a view similar to FIG. 4, showing the steel plate with cuts formed around the hole.
Figure 7:
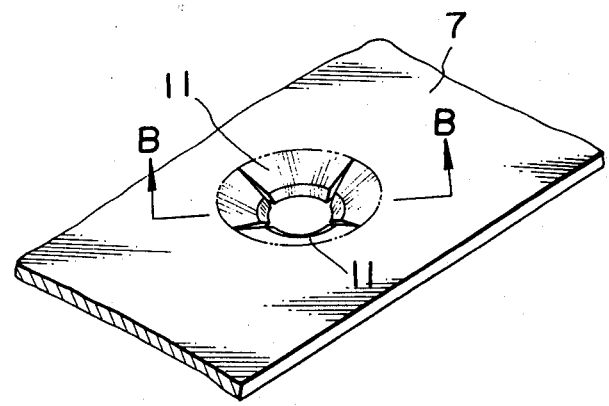
FIG. 7 is a view of the steel plate, when the portions surrounding the hole have been partly bent out of its plane.
Figure 8:
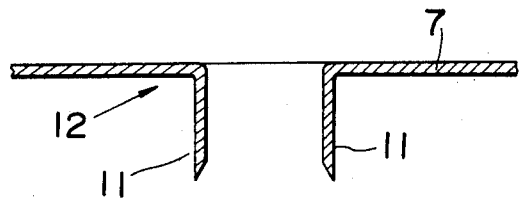
FIG. 8 is a section of the steel plate, after the portions which surrounded the hole have been bent at right angles to its plane, along the line which is indicated in FIG. 7 by B—B.

Next, cuts are made on the edge of the steel where it defines the bore 9, designated by 11 in FIG. 6. They reach out to the periphery of an imaginary ring 10. Next, the periphery of the bore 9 is pressed out by a punch and die apparatus which is not shown so as to form a plurality of projecting portions 11 which have sharp ends. It should be noticed that, strictly speaking, the cuts 11 are not necessary for the present invention, although they are helpful. If they are not made, as explained above, the material of the steel plate will split essentially radially, and this will accomplish the same end.

Figure 9:
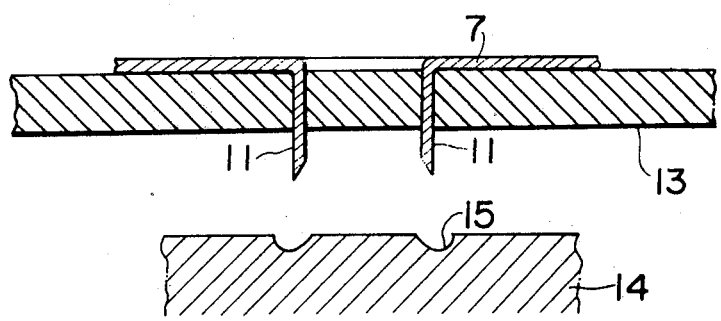
FIG. 9 is a sectional view of the steel plate and a softer plate to which it is to be joined, at the stage wherein these bent portions have been penetrated through the softer plate so as to protrude on its other side, and before they have been bent over by a die to which the assembly is being approached.
Figure 10:
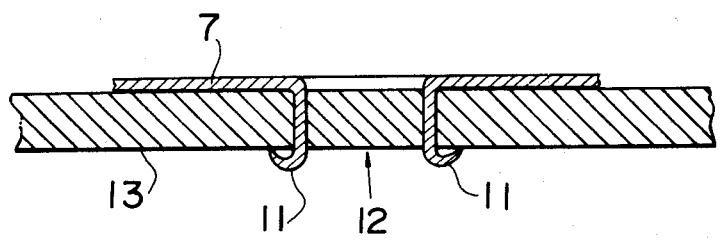
FIG. 10 is a sectional view of the steel plate and the softer plate as joined, after the ends of the joining portions have been bent over so as the engage the softer plate.

Next, the steel plate 7 is approached to the softer plate 13, so that the projecting portions penetrate through the softer plate, so as to get to the stage shown in FIG. 9. The two plates are then approached to a die as 14 in FIG. 9, and this die bends round the projecting sharp ends of the projections 11 so as to dig them against the softer plate 13, as shown in FIG. 10; i.e., to engage them therewith. It is essential for this proper engagement, therefore, as will be apparent to one skilled in the art, that the plate 7 should be harder than the plate 13.

In the shown embodiment, the bending round of the sharp projecting ends of the projections 11 is outwards, away from one another. This has the further added advantage that the area of the softer plate which is joined and in which stress is set up is much larger than if the ends were bent inwards, and thus the maximum stress per unit area is smaller, and therefore the joining is stronger. Further, if the bending is inwards, the part of the softer plate which is joined is the part inside the rough circle outlined by the holes in the softer plate cut by the projections 11 while they were being penetrated through the softer plate, and this portion might possibly tear completely out, because its connection to the body of the softer plate is weakened. This would lead to complete failure of the join.

It should be noted that, although forming the bore as a conical bore is a convenient way of ensuring that the ends of the projections 11 are sharp, in fact they could be sharpened in other ways. They need to be sharp both in order to cut through the softer plate 13, and in order to dig into and engage well with it, after they are bent around.

The bending around of the sharp ends may of course be done in other ways than by a die, although the use of a die is most convenient.

The present invention has been shown and described with reference to a particular embodiment thereof, and with reference to the drawings; however, various modifications to the form and detail of any particular embodiment can be easily made by a man skilled in the art, based upon the foregoing disclosure, without departing from the scope of the present invention. Therefore it is desired that this scope, and the breadth and cover of monopoly sought to be granted to the present invention by Letters Patent, should be delimited and defined solely by the appended claims, and not by any details of the shown embodiment, or of the drawings.

What is claimed is:

1. A method of joining together a harder plate and a softer plate, comprising the steps, in order, of:
   forming a conical bore having tapered walls in the harder plate;
   making a plurality of radial cuts along said tapered walls, each of said cuts extending to the periphery of an imaginary ring lying in the plane of the harder plate, said imaginary ring surrounding said bore thereby defining a plurality of portions formed from the harder plate;
   pressing out said plurality of portions of the harder plate by punch and die means, each of said portions projecting from the harder plate and having a sharp end;
   penetrating the projecting portions through the softer plate until the harder plate tightly contacts the softer plate; and
   bending the sharp end of the projecting portions outwardly so that they engage with the softer plate.

2. The method of claim 1, wherein the harder plate is a steel plate.

3. The method of claim 1, wherein the softer plate is a synthetic resin plate.

4. The method of claim 1, wherein the softer plate is a cardboard.

5. The method of claim 1, wherein the softer plate is a wooden plate.

6. The method of claim 2, wherein the steel plate constitutes a part of a door structure of an automotive vehicle.

7. The method of claim 1, wherein the harder plate is a trim supporting steel panel of a door structure of an automotive vehicle, and the softer plate is a cardboard member supported on the trim supporting steel panel, the trim supporting steel panel and the cardboard member being joined together by means of the projecting portions.

* * * * *